United States Patent
Campiglio et al.

(10) Patent No.: US 12,470,633 B2
(45) Date of Patent: Nov. 11, 2025

(54) NON-DISRUPTIVE SESSION TIMEOUT

(71) Applicant: Cisco Technology, Inc., San Jose, CA (US)

(72) Inventors: Ugo Campiglio, Morges (CH); Jerome Henry, Pittsboro, NC (US); Sachin D Wakudkar, Sulpice (CH); Stephen M Orr, Wallkill, NY (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 18/300,670

(22) Filed: Apr. 14, 2023

(65) Prior Publication Data
US 2024/0348694 A1     Oct. 17, 2024

(51) Int. Cl.
*H04L 67/145* (2022.01)
*H04W 36/00* (2009.01)
*H04W 88/08* (2009.01)

(52) U.S. Cl.
CPC ..... *H04L 67/145* (2013.01); *H04W 36/00837* (2018.08); *H04W 88/08* (2013.01)

(58) Field of Classification Search
CPC .......... H04L 67/145; H04W 36/00837; H04W 88/08
USPC ........................................................ 709/228
See application file for complete search history.

(56) References Cited

U.S. PATENT DOCUMENTS

| | | | | |
|---|---|---|---|---|
| 8,583,053 | B1 * | 11/2013 | Mahbod | H04L 1/1825 455/435.2 |
| 8,583,765 | B1 * | 11/2013 | Rachabathuni | H04W 76/10 709/227 |
| 2002/0016736 | A1 * | 2/2002 | Cannon | G06Q 30/0241 705/14.4 |
| 2003/0044760 | A1 * | 3/2003 | Banerjee | G09B 7/02 434/350 |
| 2008/0043684 | A1 * | 2/2008 | Hovey | H04L 69/04 370/469 |
| 2008/0062863 | A1 | 3/2008 | Ginde | |
| 2008/0065884 | A1 | 3/2008 | Emeott et al. | |
| 2009/0262718 | A1 | 10/2009 | Meier et al. | |
| 2012/0288845 | A1 * | 11/2012 | Kumar Gl | G09B 7/06 434/362 |
| 2013/0117820 | A1 | 5/2013 | Cherian et al. | |
| 2014/0267550 | A1 * | 9/2014 | Nimri | H04N 7/152 348/14.09 |
| 2014/0359279 | A1 | 12/2014 | Salomone | |
| 2015/0040195 | A1 | 2/2015 | Park et al. | |
| 2015/0043409 | A1 * | 2/2015 | Choi | H04W 52/0216 370/311 |

(Continued)

FOREIGN PATENT DOCUMENTS

EP    1956791 A1 *   8/2008   ........... H04L 63/068

OTHER PUBLICATIONS

International Search Report and Written Opinion for International Application No. PCT/US2024/023926, mailed Jul. 30, 2024, 16 Pages.

*Primary Examiner* — David P Zarka
(74) *Attorney, Agent, or Firm* — Merchant & Gould P.C.

(57) ABSTRACT

A client device may receive, from a computing device, a message indicating that a session duration of a current session is nearly over. The client device may close the current session as soon as the client device is idle for more than a configurable interval. A new session may be started with the computing device by the client device.

19 Claims, 4 Drawing Sheets

(56) References Cited

U.S. PATENT DOCUMENTS

| | | | |
|---|---|---|---|
| 2016/0037337 A1* | 2/2016 | Elliott | H04L 63/105 |
| | | | 713/168 |
| 2017/0264605 A1* | 9/2017 | Green | G06F 21/41 |
| 2018/0146375 A1* | 5/2018 | Pawar | H04W 12/062 |
| 2019/0213519 A1* | 7/2019 | Metz | G06F 1/1684 |
| 2019/0378076 A1* | 12/2019 | O'Gorman | H04M 3/56 |
| 2020/0228934 A1* | 7/2020 | HomChaudhuri | H04W 4/06 |
| 2020/0288307 A1* | 9/2020 | Li | H04L 65/80 |
| 2020/0410407 A1* | 12/2020 | Hashimoto | G06F 16/953 |
| 2021/0136582 A1* | 5/2021 | Liu | H04W 12/08 |
| 2021/0144107 A1* | 5/2021 | Liang | G06N 5/04 |
| 2022/0137696 A1* | 5/2022 | Files | G06F 1/3231 |
| | | | 713/323 |
| 2022/0232400 A1* | 7/2022 | Chasko | H04W 88/08 |
| 2022/0385753 A1* | 12/2022 | Chen | G06Q 10/063114 |
| 2023/0039335 A1 | 2/2023 | Nam et al. | |
| 2023/0164571 A1* | 5/2023 | Zhang | H04W 12/033 |
| | | | 726/2 |

* cited by examiner

FIG. 4 ously defined on PSK-based WLANs, and manually defined or returned from the RADIUS server, for each client device (e.g., through RADIUS attribute 27 (session-timeout), for 802.1X-EAP WLANs).

NON-DISRUPTIVE SESSION TIMEOUT

TECHNICAL FIELD

The present disclosure relates generally to providing non-disruptive session timeout.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Non-disruptive session timeout may be provided. A client device may receive, from a computing device, a message indicating that a session duration of a current session is nearly over. The client device may close the current session as soon as the client device is idle for more than a configurable interval. A new session may be started with the computing device by the client device.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

When a client device connects to a wireless network, a session is created on the Access Point (AP)/Wireless Lan Controller (WLC). For security and maintainability reasons, the network framework (Remote Authentication Dial In User Service (RADIUS) and/or AP/WLC) may assign a hard maximum session duration value for each client device. The value may not be in Wi-Fi, but may be an infrastructure decision.

The session maximum value is different from an idle timeout. With the idle timeout value, an AP may de-associate a client device that has been inactive (e.g., no traffic) for more than a given time. Irrespective of that timer, the AP/WLC may keep (i.e., cache) the session information for the client device (e.g., including Pairwise Master Key (PMK), Pairwise Master Key Security Association (PMKSA), client device context, etc.) This caching may allow a client device to leave the network (e.g., a user leave the office with their phone for lunch) and re-join the network upon return with a shortened re-association exchange.

However, the client devices keys and context (i.e., the session information) may not be kept indefinitely. In Pre-Shared Key (PSK)-based networks, there may be a risk of sessions where the security context (i.e., the session information) of all removed client devices end up clogging the AP memory or WLC memory. Keeping alive the security context of a client device that is gone may increases the network security exposure. Accordingly, networks may implement a form of hard maximum session duration value that may be manually defined on PSK-based WLANs, and manually defined or returned from the RADIUS server, for each client device (e.g., through RADIUS attribute 27 (session-timeout), for 802.1X-EAP WLANs).

The maximum session duration value may be a hard limit, in that it may not relate to the client device activity. For example, if a WLAN security team has estimated that a PMKSA should not be kept active for more than 24 hours, then the client device must start a new session at the end of the maximum session duration value, even if the client device is a continuous transmitter (e.g., security camera).

Such hard limit may be disrupting to the client device experience, where client devices connect to the network (e.g., morning of day 1), and after a given interval (e.g., morning of day 2) get suddenly disconnected, with the need to re-establish all sessions and all connections. This disruption may be an annoyance at the time when client devices were running mostly non-real time applications. In scenarios where Wi-Fi has become business-critical, and where time and latency-sensitive applications are becoming common (e.g., Virtual Reality (VR)/Augmented Reality (AR), connected factories, remote surgery, etc.), this hard session-reset may comprise a major issue.

In wireless networks, the client device may have no information about the maximum session duration and thus may not proactively renew its session. The result may be an abrupt termination of the session that may be disruptive to the user experience. Embodiments of the disclosure may provide a process for the infrastructure to inform the client device about the maximum session value and to renew its PMKSA before the expiration of the session timer.

Figure 1:
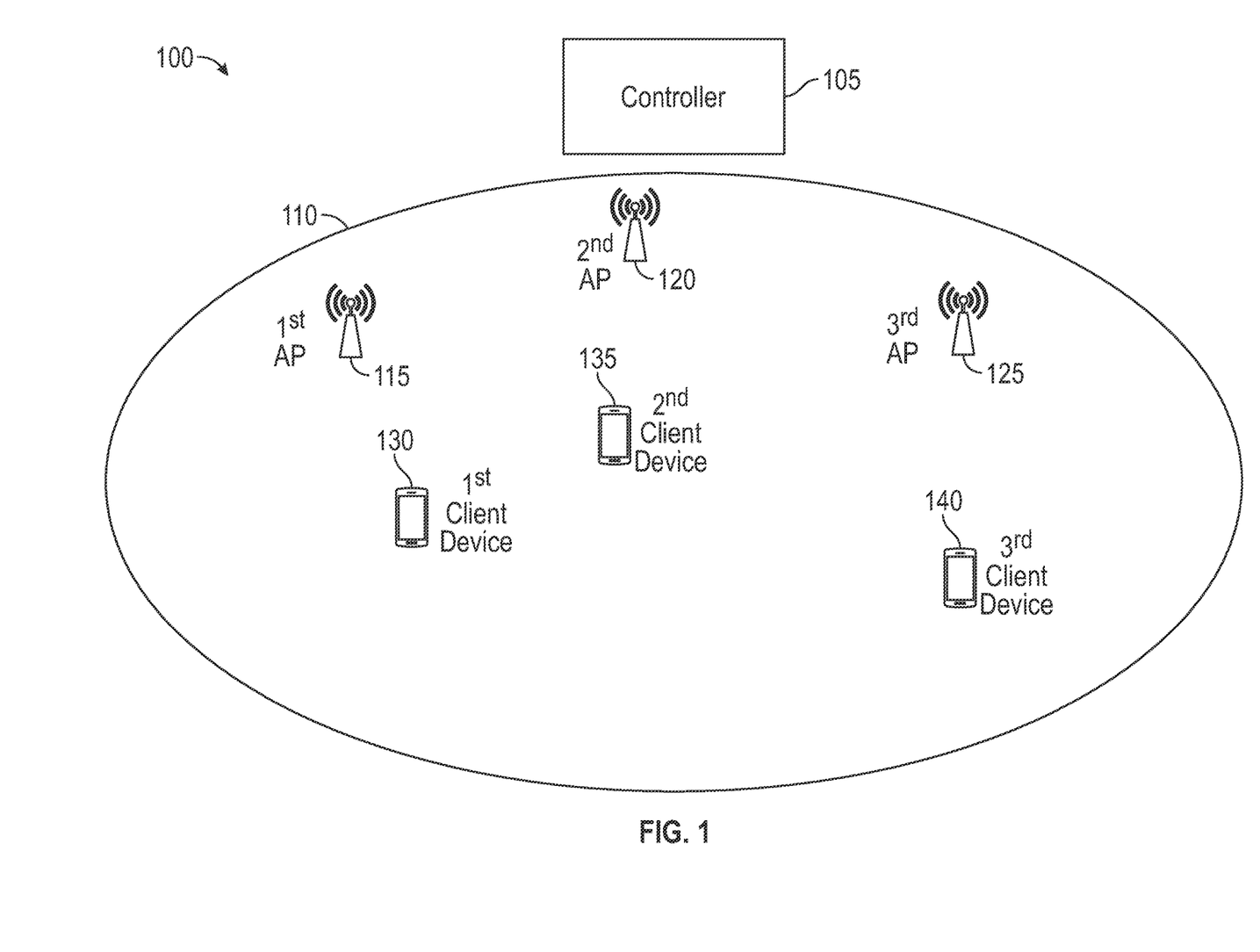
FIG. 1 is a block diagram of an operating environment for providing a non-disruptive session timeout.

FIG. 1 shows an operating environment 100 providing a non-disruptive session timeout. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi-Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide a non-disruptive session timeout.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Session Expiration Notification

In order to avoid disrupting the user work on a client device (e.g., voice or video streams) an authenticator may warn a connected client device about a session that is about to expire. In this embodiment, a hard maximum session duration value (i.e., timeout value) may be configured (e.g., manual configuration for PSK-WLANs, manual or RADIUS attribute 27 for 802.1X-EAP). As the session duration nears the timeout value, an AP may send an unsolicited specific action frame before the timeout expiration. The action frame may comprise a PMKSA/session expiration warning (e.g., "n seconds before session timeout", where n may, for example, be a 16 bit value in units of 1000 TUs). The client device may then attempt to close the session as soon as it is idle for more than a configurable interval. As soon as the client device de-associates following the transmission of the warning frame, the WLC/AP may flush the client entry (i.e., the session information) and may trigger associated accounting updates. Accordingly, the security context of the client device may be removed. The client device may then start a new session with a new timeout value. This embodiment may use client device support.

Session Timeout Notification

Figure 2:
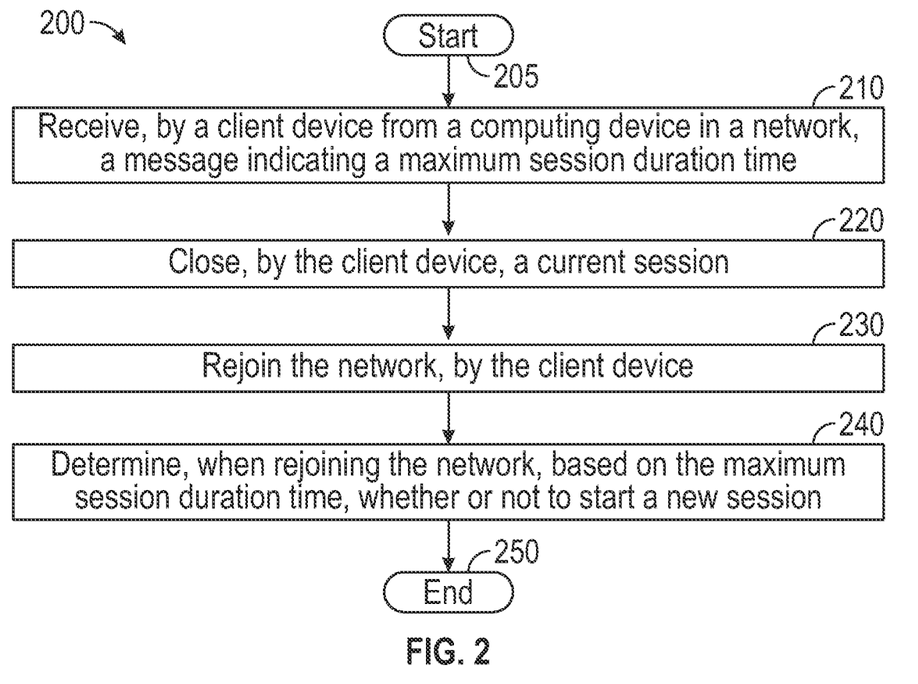
FIG. 2 is a flow chart of a method for providing a non-disruptive session timeout.

FIG. 2 is a flow chart setting forth the general stages involved in a method 200 consistent with embodiments of the disclosure for providing non-disruptive session timeout. Method 200 may be implemented using first AP 115 and first client device 130 as described in more detail above with respect to FIG. 1. Ways to implement the stages of method 200 will be described in greater detail below.

Method 200 may begin at starting block 205 and proceed to stage 210 where first client device 130 may receive, from a computing device (e.g., first AP 115) in a network (e.g., coverage environment 110), a message indicating a maximum session duration time. For example, in a RADIUS approach, the message indicating the maximum session duration time may comprise an Extensible Authentication Protocol (EAP) Session-Id message (e.g., Request For Comments (RFC) 8940) augmented to include the maximum session duration time. In a Wi-Fi approach, the message indicating the maximum session duration time may comprise an unsolicited action frame that may be provided by an AP after an authentication four-way handshake. In either approach, during the authentication, an authenticator may inform the client device about the maximum session duration time obtained from, for example, a RADIUS server. The client device may store this information and may use it at the next connection.

From stage 210, where first client device 130 receives, from the computing device in the network, the message indicating the maximum session duration time, method 200 may advance to stage 220 where first client device 130 may close a current session. For example, a user of first client device 130 may leave coverage environment 110 and thus first client device 130 may disassociate from first AP 115.

Once first client device 130 closes the current session in stage 220, method 200 may continue to stage 230 where first client device 130 may rejoin the network. For example, the user of first client device 130 may return to coverage environment 110 and thus first client device 130 may reassociate with first AP 115.

After first client device 130 rejoins the network in stage 230, method 200 may proceed to stage 240 where first client device 130 may determine, when rejoining the network, based on the maximum session duration time, whether or not to start a new session. For example, when a client (e.g., first client device 130) rejoins the same network (e.g., coverage environment 110), the client device may be aware whether it may need to establish a new session or whether there may still be a valid one. The client device may decide to request a new session even if the current session is still valid. For example, the client device may be configured to create a new session if the remaining time of the maximum session duration time is shorter than a predetermined value.

If the client device requests a new session, the client device may send an authentication request indicating it is requesting a fresh session using, for example, a field in the EAP request. In an embodiment, a specific field may be added in the EAP response sent by the client device to the RADIUS server. In another embodiment, the client device may set the RFC 8940 session Id to 0. In both cases, the RADIUS server may return a new maximum session duration time value for that client to the authenticator, and the authenticator may share the new maximum session duration time value with the client device as described above. The new session may also start a new accounting session for the client device.

In other embodiments, the client device may query the AP at any time for the value of the maximum session duration time value. The AP may respond with the configured maximum session duration time value and the remaining time. In a variation of this embodiment, the client device may proactively terminate its session (e.g., either by sending a specific action frame before disassociation, or by using a specific reason code in its disassociation frame). Once first client device 130 determines, when rejoining the network, based on the maximum session duration time, whether or not to start a new session in stage 240, method 200 may then end at stage 250.

Adaptive Session Timeout

Figure 3:
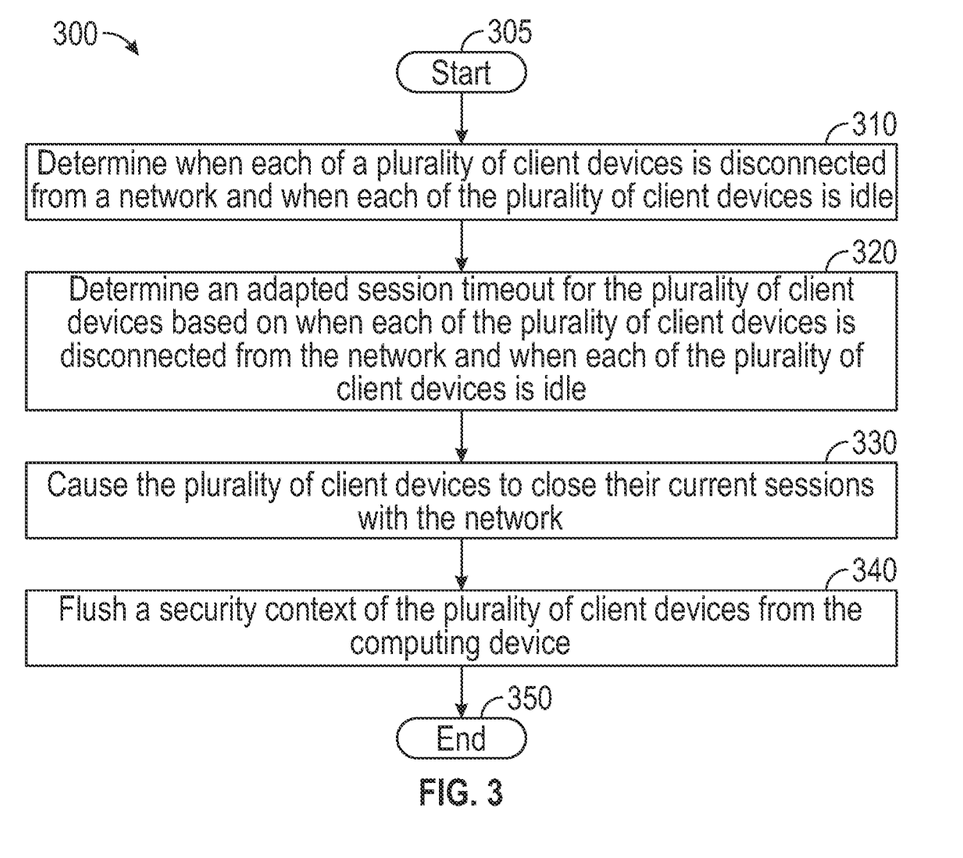
FIG. 3 is a flow chart of a method for providing a non-disruptive session timeout.

FIG. 3 is a flow chart setting forth the general stages involved in a method 300 consistent with embodiments of the disclosure for providing non-disruptive session timeout. Method 300 may be implemented using controller 105 as described in more detail above with respect to FIG. 1 or computing device 400 as described in more detail below with respect to FIG. 4. Ways to implement the stages of method 300 will be described in greater detail below.

This embodiment may provide backward compatibility with client devices that may not support the session expiration notification embodiment or the session timeout notification embodiment as described above. This embodiment may also increase the flexibility of the aforementioned embodiments. All client devices may not need the same maximum session duration time. Accordingly, this embodiment may use a management entity. This management entity may comprise a Session Duration Management Entity (SDME) disposed in a network management platform (e.g., the DNAC) with read/write (RW) access to both the authenticator (AP/WLC) and the RADIUS server. The SDME may dynamically learn the timeout duration needed by the client devices and may write the values in the AP/WLC (e.g., PSK networks, for each individual Service Set Identifier (SSID) and/or the RADIUS server (individual RADIUS groups).

Method 300 may begin at starting block 305 and proceed to stage 310 where computing device 400 may determine when each of a plurality of client devices (e.g., first client device 130, second client device 135, and third client device 140) is disconnected from a network (e.g., coverage environment 110) and when each of the plurality of client devices is idle. For example, different client devices may have different session needs. A client device may connect to the network for a limited amount of time. In other words, the client devices connect to the network then disconnect. The SDME may record these connect/disconnect events. The SDME may also record the client devices in the idle state.

From stage 310, where computing device 400 determines when each of the plurality of client devices is disconnected from the network and when each of the plurality of client devices is idle, method 300 may advance to stage 320 where computing device 400 may determine an adapted session timeout for the plurality of client devices based on when each of the plurality of client devices is disconnected from the network and when each of the plurality of client devices is in idle. For example, the SDME may create the adapted session timeout on the radius server for target client device groups. The adapted session timeout may be computed to a time likely to be between sessions to avoid the session timeout to expire while a user is actively using a client device. For example, the SDME may configure a timeout time (e.g., instead of a timeout described as a duration) that matches the Time-of-Day (ToD) when the largest count of client devices are either not connected or idle (e.g., 2 AM: 97% of the client devices not connected; 2% of the client devices connected and idle; and 1% of the client devices connected and active).

To avoid overload of mass re-authentications from a group of client devices (e.g., students walking into a building at 8 AM getting PMKSA timers within seconds of each other), the SDME may perform a session timeout distribution with a staggering of the timers between client devices that associate within a given time/location to prevent overloading the infrastructure (e.g., AP, Authenticator, and Authentication Server) with authentications and rekeying events.

Once computing device 400 determines the adapted session timeout for the plurality of client devices based on when each of the plurality of client devices is disconnected from the network and when each of the plurality of client devices is idle in stage 320, method 300 may continue to stage 330 where computing device 400 may cause the plurality of client devices to close their current sessions with the network. For example, for a given client device or group of client devices, the SDME may cause the given client device or the group of client devices to disassociate and end their sessions.

After computing device 400 causes the plurality of client devices to close their current sessions with the network in stage 330, method 300 may proceed to stage 340 where computing device 400 may flush a security context of the plurality of client devices from the computing device. For example, as soon as the client device disassociates, the SDME may flush the client device entry and may trigger associated accounting updates. Accordingly, the security context of the client device or the group of client devices may be removed. At a later point in time the client devices may then start new sessions with refreshed new timeout values.

Always connected devices (e.g., printer and phones) may also be idle (e.g., the example above, during the night). However, other devices (e.g., security cameras) may be active at that time. Thus an administrator may create bins of devices with different timeout times. Similarly, for cases where the timeout value is not shared with the client devices, soft and hard limits may be configured (e.g., session timeout validity 24 hours, with cutoff time at 2 AM or first idle time after 2 AM, but before the 24 h limit). Once computing device 400 flushes the security context of the plurality of client devices from the computing device in stage 340, method 300 may then end at stage 350.

Figure 4:
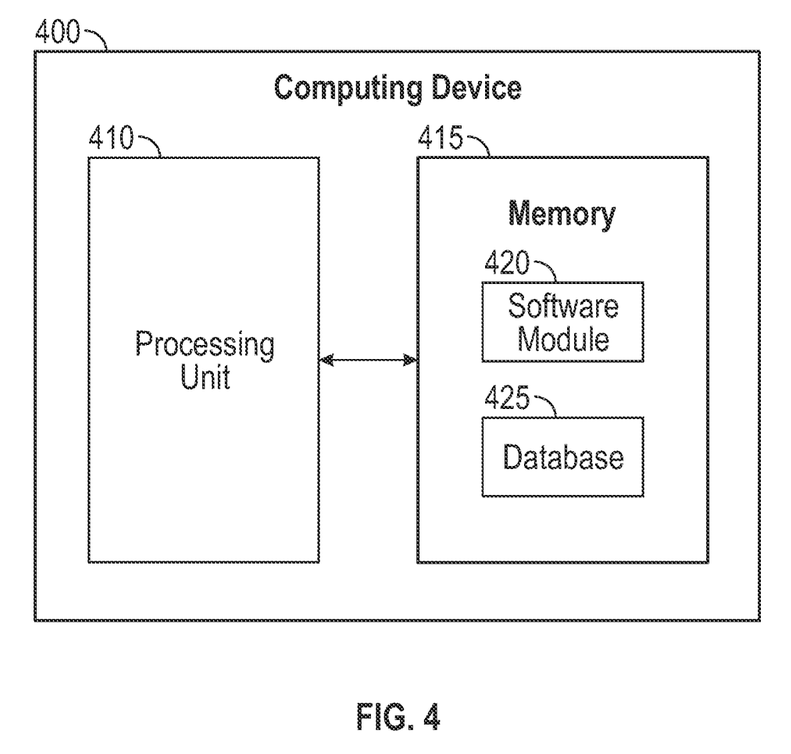
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing a non-disruptive session timeout as described above with respect to FIG. 2 and FIG. 3. Computing device 400, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a client device from an access point, an unsolicited specific action frame after initiation of a current session and as a session duration of the current session nears a timeout value and before a timeout expiration, the unsolicited specific action frame indicating that the session duration of the current session established between the access point and the client device is expiring in the future, wherein the session duration is a hard time limit comprising the timeout value manually defined for each session from each client device associated with the access point in a Pre-Shared Key (PSK)-based network, and wherein the unsolicited specific action frame comprises a session expiration warning and an amount of time until the session duration is expiring;

closing, by the client device, the current session as soon as the client device is idle for more than a configurable interval following receipt of the unsolicited specific action frame indicating that the session duration of the current session is expiring in the future; and starting a new session with the access point by the client device following the closing of the current session.

2. The method of claim 1, wherein the amount of time until the session duration is expiring comprises a 16 bit value in units of 1,000 Time Units (TUs).

3. The method of claim 1, further comprising determining, by the access point, that the client device closed the current session.

4. The method of claim 3, further comprising flushing, by the access point in response to determining that the client device closed the current session, security context of the client device from the access point.

5. The method of claim 1, wherein the unsolicited specific action frame indicating the session duration time comprises an Extensible Authentication Protocol (EAP) Session-Id message augmented to include the session duration time.

6. The method of claim 1, wherein the unsolicited action frame is provided after an authentication four-way handshake.

7. The method of claim 1, wherein closing, by the client device, the current session as soon as the client device is idle for more than the configurable interval following receipt of the unsolicited specific action frame indicating that the session duration of the current session is expiring in the future comprises closing, by the client device, the current session before the end of the session duration.

8. A method comprising:
receiving, by a client device from an access point in a network, an unsolicited specific action frame after initiation of a current session and as a session duration of a current session nears a timeout value and before a timeout expiration, the unsolicited specific action frame indicating a maximum session duration time, wherein the maximum session duration time is a hard time limit comprising the timeout value defined for each session from each client device associated with the access point in a Pre-Shared Key (PSK)-based network, and wherein the unsolicited specific action frame comprises a session expiration warning;

closing, by the client device, a current session following receipt of the unsolicited specific action frame;

rejoining the network, by the client device following the closing of the current session; and determining, when rejoining the network, based on the maximum session duration time, whether or not to start a new session.

9. The method of claim 8, wherein determining, when rejoining the network, based on the maximum session duration time, whether or not to start the new session comprises determining not to start the new session when there is still a valid session based on the maximum session duration time.

10. The method of claim 8, wherein determining, when rejoining the network, based on the maximum session duration time, whether or not to start the new session comprises determining to start the new session when there is no longer a valid session based on the maximum session duration time.

11. The method of claim 8, wherein determining, when rejoining the network, based on the maximum session duration time, whether or not to start the new session comprises determining to start the new session when there is still a valid session based on the maximum session duration time and remaining time for the valid session is less than a predetermined time.

12. The method of claim 8, wherein the unsolicited specific action frame indicating the maximum session duration time comprises an Extensible Authentication Protocol (EAP) Session-Id message augmented to include the maximum session duration time.

13. The method of claim 8, wherein the unsolicited action frame is provided after an authentication four-way handshake.

14. A system comprising:
a memory storage; and
a processing unit coupled to the memory storage, wherein the processing unit is operative to:
receive, from an access point, an unsolicited specific action frame after initiation of a current session and as a session duration of a current session nears a timeout value and before a timeout expiration, the message indicating that the session duration of the current session established between the access point and a client device is expiring in the future, wherein the session duration is a hard time limit comprising the timeout value defined for each session from each client device associated with the access point in a Pre-Shared Key (PSK)-based network, and wherein the unsolicited specific action frame comprises a session expiration warning and an amount of time until the session duration is expiring;
close the current session as soon as the client device is idle for more than a configurable interval following receipt of the unsolicited specific action frame indicating that the session duration of the current session is expiring in the future; and
start a new session with the access point by the client device following the closing of the current session, wherein starting the new session restarts the session duration.

15. The system of claim 14, wherein the amount of time until the session duration is expiring comprises a 16 bit value in units of 1,000 Time Units (TUs).

16. The system of claim 14, wherein the computing device is configured to determine that the client device closed the current session.

17. The system of claim 16, wherein the computing device is further configured to flush, in response to determining that the client device closed the current session, security context of the client device from the computing device.

18. The system of claim 14, wherein the unsolicited specific action frame indicates the maximum session duration time.

19. The system of claim 18, wherein the unsolicited specific action frame comprises an Extensible Authentication Protocol (EAP) Session-Id message augmented to include the maximum session duration time.

* * * * *